US009614465B2

United States Patent
Shriver et al.

(10) Patent No.: US 9,614,465 B2
(45) Date of Patent: Apr. 4, 2017

(54) ELECTRIC MOTOR CLAMPING SYSTEM

(75) Inventors: Michael H. Shriver, Highland, UT (US); John W. Stevens, West Bountiful, UT (US)

(73) Assignee: Moog Inc., East Aurora, NY (US)

( * ) Notice: Subject to any disclaimer, the term of this patent is extended or adjusted under 35 U.S.C. 154(b) by 9 days.

(21) Appl. No.: 14/234,778

(22) PCT Filed: Jul. 26, 2011

(86) PCT No.: PCT/US2011/045371
§ 371 (c)(1),
(2), (4) Date: Jan. 24, 2014

(87) PCT Pub. No.: WO2013/015791
PCT Pub. Date: Jan. 31, 2013

(65) Prior Publication Data
US 2014/0152201 A1    Jun. 5, 2014

(51) Int. Cl.
*H02P 3/14* (2006.01)
*B64C 13/50* (2006.01)
(Continued)

(52) U.S. Cl.
CPC ............... *H02P 3/14* (2013.01); *B64C 9/323* (2013.01); *B64C 13/50* (2013.01); *F03D 7/0252* (2013.01);
(Continued)

(58) Field of Classification Search
CPC ...... B60T 8/1703; B60T 13/741; B60T 8/885; B60T 17/221; B60T 8/00; B60T 13/02;
(Continued)

(56) References Cited

U.S. PATENT DOCUMENTS 3,581,168 A    5/1971    Kirkby
3,975,668 A    8/1976    Davie
(Continued)

FOREIGN PATENT DOCUMENTS

EP    2080902 A2    7/2009
EP    2175552 A1    4/2010
(Continued)

OTHER PUBLICATIONS

The International Search Report (ISR) and Written Opinion of the International Searching Authority for International Application No. PCT/US2011/045371; Publication No. WO 2013/015791; dated May 22, 2012.

(Continued)

*Primary Examiner* — Paul Ip
(74) *Attorney, Agent, or Firm* — Rowland Richards, Esq.; Harter Secrest & Emery LLP (57) ABSTRACT

An electric motor system having a power supply, an electric motor connected to the power supply, an object driven by the motor having a range of motion and a substantially neutral position within the range of motion, a power sensor configured to sense power from the power supply, a position sensor configured to sense position of the object in at least a portion of the range of motion, an energy storage, a controller connected to the power supply and the energy storage, wherein the controller is configured to brake the motor as a function of the position sensor, the neutral position and the power sensor.

63 Claims, 7 Drawing Sheets

(51) Int. Cl.
*F03D 7/02* (2006.01)
*H02P 29/024* (2016.01)
*H02P 3/22* (2006.01)
*B64C 9/32* (2006.01)
*H02P 3/08* (2006.01)
*H02P 3/12* (2006.01)

(52) U.S. Cl.
CPC ............ *H02P 3/08* (2013.01); *H02P 3/12* (2013.01); *H02P 3/22* (2013.01); *H02P 29/025* (2013.01); *F05B 2260/507* (2013.01); *Y02E 10/723* (2013.01)

(58) Field of Classification Search
CPC .......... B60T 13/74; B60T 13/746; B60T 1/10; B60T 2270/404; B60T 2270/406; B60T 2270/413; B60T 2270/414; B60T 2270/416
USPC .............. 318/376, 63, 400.02, 400.29, 434; 187/290, 296; 244/76 R, 111, 195 R
See application file for complete search history.

(56) References Cited

U.S. PATENT DOCUMENTS

| | | | |
|---|---|---|---|
| 4,367,435 A | 1/1983 | Bailey et al. | |
| 4,367,529 A * | 1/1983 | Masclet | B60T 8/1703 303/126 |
| 4,831,469 A | 5/1989 | Hanson et al. | |
| 4,841,202 A * | 6/1989 | Dishner et al. | 318/14 |
| 4,885,514 A * | 12/1989 | Novis | G05D 1/0061 244/194 |
| 4,902,954 A | 2/1990 | Oshima et al. | |
| 4,908,553 A | 3/1990 | Hoppie et al. | |
| 5,083,723 A * | 1/1992 | Grieb | B64D 3/02 244/1 TD |
| 5,144,153 A * | 9/1992 | Scheppmann, II | H02J 9/06 307/66 |
| 5,184,049 A | 2/1993 | Kiuchi | |
| 5,252,902 A * | 10/1993 | Uehara | G05B 19/4141 318/599 |
| 5,537,015 A * | 7/1996 | Karwath | 318/400.29 |
| 5,705,904 A | 1/1998 | Kuriyama | |
| 5,739,811 A * | 4/1998 | Rosenberg | A63F 13/06 345/161 |
| 5,838,124 A | 11/1998 | Hill | |
| 5,907,192 A | 5/1999 | Lyons | |
| 5,999,168 A * | 12/1999 | Rosenberg | A63F 13/06 345/156 |
| 6,061,004 A * | 5/2000 | Rosenberg | G06F 3/016 341/20 |
| 6,128,006 A * | 10/2000 | Rosenberg | G01C 21/36 345/161 |
| 6,166,723 A * | 12/2000 | Schena | G05G 9/047 345/157 |
| 6,219,033 B1 * | 4/2001 | Rosenberg | A63F 13/06 345/157 |
| 6,232,891 B1 * | 5/2001 | Rosenberg | G05G 9/047 341/20 |
| 6,252,579 B1 * | 6/2001 | Rosenberg | G06F 3/016 345/157 |
| 6,259,382 B1 * | 7/2001 | Rosenberg | G05G 9/047 341/20 |
| 6,291,951 B1 | 9/2001 | Baulier | |
| 6,317,116 B1 * | 11/2001 | Rosenberg | G05G 9/047 345/163 |
| 6,342,880 B2 * | 1/2002 | Rosenberg | 345/156 |
| 6,538,347 B1 * | 3/2003 | Baranowski | H01H 11/0062 307/137 |
| 6,555,926 B2 | 4/2003 | Gondron | |
| 6,742,630 B2 * | 6/2004 | Eilinger | B66B 1/30 187/290 |
| 6,827,311 B2 * | 12/2004 | Wingett | B64C 13/50 244/227 |
| 6,860,452 B2 * | 3/2005 | Bacon et al. | 244/194 |
| 6,921,989 B2 * | 7/2005 | Baranowski | H01H 11/0062 218/154 |
| 6,922,032 B2 | 7/2005 | Maeda | |
| 6,938,733 B2 * | 9/2005 | Eilinger | B66B 5/027 187/290 |
| 6,956,751 B2 * | 10/2005 | Youm | H02M 1/32 318/375 |
| 7,007,897 B2 * | 3/2006 | Wingett | B64C 13/50 244/227 |
| 7,109,679 B2 | 9/2006 | Edson et al. | |
| 7,137,595 B2 * | 11/2006 | Barba | B64C 1/1407 188/171 |
| 7,227,331 B2 | 6/2007 | Galli et al. | |
| 7,248,009 B1 * | 7/2007 | Sundquist | H02P 29/0055 318/432 |
| 7,268,515 B1 * | 9/2007 | Tsai | H02P 5/74 318/721 |
| 7,303,167 B2 * | 12/2007 | Barba | B64C 1/1407 188/171 |
| 7,658,349 B2 * | 2/2010 | Abel | B64C 13/10 244/223 |
| 7,750,593 B2 * | 7/2010 | Tillotson | B64C 13/12 318/568.11 |
| 8,078,340 B2 * | 12/2011 | Johnson | B64C 13/10 244/223 |
| 8,219,909 B2 * | 7/2012 | Hanlon | B64C 13/10 341/20 |
| 8,235,180 B2 * | 8/2012 | Kattainen | B66B 1/32 187/288 |
| 8,340,848 B2 * | 12/2012 | Son | H02P 21/0039 318/400.04 |
| 8,698,444 B2 * | 4/2014 | Malkin et al. | 318/696 |
| 2002/0139593 A1 * | 10/2002 | Charaudeau | B60K 6/28 180/65.245 |
| 2003/0071467 A1 | 4/2003 | Calley et al. | |
| 2003/0071522 A1 * | 4/2003 | Baranowski | H01H 11/0062 307/116 |
| 2003/0089556 A1 * | 5/2003 | Eilinger | B66B 5/02 187/290 |
| 2003/0089557 A1 * | 5/2003 | Eilinger | B66B 1/30 187/296 |
| 2003/0089826 A1 * | 5/2003 | Barba | B64C 1/1407 244/129.1 |
| 2003/0090228 A1 * | 5/2003 | Wilkens | G05B 19/4062 318/560 |
| 2003/0107349 A1 * | 6/2003 | Haydock | H02J 9/062 322/28 |
| 2003/0127569 A1 * | 7/2003 | Bacon et al. | 244/195 |
| 2004/0056153 A1 * | 3/2004 | Barba | B64C 1/1407 244/129.5 |
| 2004/0160792 A1 * | 8/2004 | Youm | H02M 1/32 363/37 |
| 2004/0195441 A1 * | 10/2004 | Wingett | B64C 13/50 244/99.5 |
| 2005/0082999 A1 | 4/2005 | Ether | |
| 2005/0109565 A1 * | 5/2005 | Ralea et al. | 188/71.5 |
| 2005/0127241 A1 * | 6/2005 | Wingett | B64C 13/50 244/99.5 |
| 2005/0258795 A1 * | 11/2005 | Choi | B29C 45/7666 318/625 |
| 2005/0269872 A1 * | 12/2005 | Ralea | 303/20 |
| 2006/0108864 A1 * | 5/2006 | Evans et al. | 303/126 |
| 2006/0108867 A1 * | 5/2006 | Ralea | 303/152 |
| 2006/0138281 A1 * | 6/2006 | Barba | B64C 1/1407 244/129.5 |
| 2006/0138880 A1 | 6/2006 | Kimura et al. | |
| 2006/0195244 A1 * | 8/2006 | Thibault | 701/70 |
| 2006/0195246 A1 * | 8/2006 | Thibault | 701/70 |
| 2007/0132423 A1 | 6/2007 | Ajima et al. | |
| 2007/0153433 A1 * | 7/2007 | Sundquist | H02P 29/0055 361/25 |
| 2007/0163844 A1 * | 7/2007 | Jahkonen | B66B 1/30 187/290 |

(56) References Cited

U.S. PATENT DOCUMENTS

| | | | |
|---|---|---|---|
| 2007/0210584 A1* | 9/2007 | Stahlhut et al. | 290/52 |
| 2007/0235267 A1* | 10/2007 | Liebert | 188/1.11 L |
| 2008/0079373 A1* | 4/2008 | Melfi | H02P 3/18 318/63 |
| 2008/0079381 A1* | 4/2008 | Hanlon et al. | 318/561 |
| 2008/0099629 A1* | 5/2008 | Abel | B64C 13/503 244/223 |
| 2008/0100252 A1* | 5/2008 | Tillotson | B64C 13/12 318/628 |
| 2008/0142642 A1* | 6/2008 | Marino | B64C 13/503 244/223 |
| 2008/0169776 A1* | 7/2008 | Acker | H02P 3/24 318/139 |
| 2008/0203224 A1* | 8/2008 | Yount | B64C 13/42 244/99.5 |
| 2008/0283346 A1* | 11/2008 | Ralea | 188/156 |
| 2008/0284358 A1* | 11/2008 | Ralea | 318/14 |
| 2009/0021196 A1* | 1/2009 | Peyras et al. | 318/400.02 |
| 2009/0125166 A1* | 5/2009 | Johnson | B64C 13/10 701/3 |
| 2009/0140676 A1* | 6/2009 | Son | H02P 21/0039 318/400.04 |
| 2009/0157234 A1* | 6/2009 | Breit | B64C 13/50 701/3 |
| 2009/0189551 A1 | 7/2009 | Kamigauchi | |
| 2009/0210074 A1* | 8/2009 | Lill | G05B 19/02 700/19 |
| 2009/0218175 A1* | 9/2009 | Wesson | B66B 1/308 187/290 |
| 2009/0224541 A1* | 9/2009 | Stahlhut et al. | 290/7 |
| 2009/0267545 A1* | 10/2009 | Viitanen et al. | 318/380 |
| 2009/0278401 A1 | 11/2009 | Summers et al. | |
| 2009/0302788 A1* | 12/2009 | Mitsuda | H02P 3/18 318/376 |
| 2009/0309527 A1 | 12/2009 | Anuradha et al. | |
| 2010/0001678 A1* | 1/2010 | Potter et al. | 318/569 |
| 2010/0039003 A1 | 2/2010 | Palm et al. | |
| 2010/0044160 A1* | 2/2010 | Agirman | B66B 5/027 187/290 |
| 2010/0066281 A1* | 3/2010 | Hahle | B60L 7/003 318/380 |
| 2010/0066282 A1* | 3/2010 | Hahle | B60L 7/06 318/380 |
| 2010/0078519 A1* | 4/2010 | Cahill | 244/111 |
| 2010/0188267 A1* | 7/2010 | Hanlon | B64C 13/10 341/20 |
| 2010/0234170 A1* | 9/2010 | Masfaraud | B60L 7/16 477/4 |
| 2010/0252691 A1* | 10/2010 | Malkin | B64C 13/28 244/76 R |
| 2010/0274458 A1* | 10/2010 | Cahill et al. | 701/76 |
| 2010/0280725 A1* | 11/2010 | Cahill | 701/70 |
| 2010/0308584 A1* | 12/2010 | Coates | H02J 3/32 290/44 |
| 2010/0332065 A1* | 12/2010 | Lin | B60L 7/16 701/22 |
| 2011/0006162 A1* | 1/2011 | Sperandei | B64G 1/283 244/165 |
| 2011/0025059 A1* | 2/2011 | Helle | F03D 7/0224 290/44 |
| 2011/0127935 A1* | 6/2011 | Gao | H02M 1/36 318/400.3 |
| 2011/0222320 A1* | 9/2011 | Delmerico | H02J 3/32 363/37 |
| 2011/0253833 A1* | 10/2011 | Anastasio | B64C 25/42 244/111 |
| 2011/0278099 A1* | 11/2011 | Kattainen | B66B 1/32 187/288 |
| 2012/0013278 A1* | 1/2012 | Hanlon | H02P 3/18 318/379 |
| 2012/0261217 A1* | 10/2012 | Agirman | B66B 5/027 187/290 |
| 2013/0038249 A1* | 2/2013 | Tabatabaei | B60L 1/20 318/3 |
| 2013/0082149 A1* | 4/2013 | Boucaud et al. | 244/228 |
| 2013/0292992 A1* | 11/2013 | Cahill | 301/6.2 |
| 2013/0297101 A1* | 11/2013 | Hanlon et al. | 701/3 |

FOREIGN PATENT DOCUMENTS

| | | |
|---|---|---|
| JP | S5878897 A | 5/1983 |
| JP | S63-003667 A | 1/1988 |
| JP | H3-111768 U | 11/1991 |
| JP | H10127092 A | 5/1998 |
| JP | 2000324605 A | 11/2000 |
| JP | 2001218476 A | 8/2001 |
| JP | 2005263408 A | 9/2005 |
| JP | 2007068311 A | 3/2007 |
| JP | 2007104869 A | 4/2007 |
| JP | 2007291976 A | 11/2007 |
| JP | 2009296729 A | 12/2009 |

OTHER PUBLICATIONS

The (IB/373) International Preliminary Report on Patentability Chapter I for International Patent Application No. PCT/US2011/045371; Publication No. WO 2013-015791; dated Jan. 28, 2014.

* cited by examiner

ELECTRIC MOTOR CLAMPING SYSTEM

TECHNICAL FIELD

The technical field relates to dynamic and regenerative electric motor braking systems, and more specifically to an improved electric motor braking system.

BACKGROUND ART

Several electromechanical braking systems are known. For example, U.S. Patent Application Publication No. 2006/0108867 is directed to an electromechanical brake having electrical energy backup and regenerative energy recovery that may be used in an aircraft braking system. According to this publication, a capacitor is used to store energy for a controller when a power source voltage drops below a stored energy potential and regenerative energy may be recovered from an actuator for the stored energy supply.

U.S. Pat. No. 3,975,668 teaches use of dynamic braking in a three phase motor in which the coils of the motor are connected in a six winding delta configuration, and a direct braking current is applied between two center taps of the configuration.

U.S. Pat. No. 4,831,469 is directed to a braking method for a disk drive head having a capacitor for storing power to retract and brake the motor upon power loss.

BRIEF SUMMARY OF THE INVENTION

With parenthetical reference to the corresponding parts, portions or surfaces of the disclosed embodiments, merely for the purposes of illustration and not by way of limitation, an electric motor system (110, 210, 310) is provided comprising a power supply (112, 212), an electric motor (111, 211, 311) connected to the power supply, an object (116, 216, 316) driven by the motor having a range of motion and a substantially neutral position (134) within the range of motion, a power sensor (114) configured to sense power from the power supply, a position sensor (115) configured to sense the position of the object in at least a portion of its range of motion, an energy storage (123, 223) and a controller (122, 222) connected to the power supply and the energy storage, the controller configured and arranged to brake the motor as a function of the position sensor, the neutral position and the power sensor.

The controller may be configured to dynamically brake the motor. The system may further comprise a dissipation switch (SW2) in series with a dissipation resistor (R2), wherein the controller is configured to operate the dissipation switch such that energy from the motor is dissipated with the dissipation resistor.

The controller may be configured to regeneratively brake the motor. The electric motor system may further comprise a switching network (219), wherein the controller is configured to operate the switching network such that energy from the motor is used to charge the energy storage when the energy storage is not fully charged. The switching network may comprise six switch elements in an H bridge configuration. The switch elements in the switching network may comprise IGBTs or MOSFETs. The energy storage may be a capacitor (C1) or a battery.

The controller may be configured to actively brake the motor. The controller may further comprise a separate brake actuator (229). The electric motor system may further comprise a switching network. The switching network may comprise six switch elements in an H bridge configuration. The switch elements in the switching network may comprise IGBTs or MOSFETs.

The controller may be configured to selectively actively brake, dynamically brake or regeneratively brake the motor. The electric motor system may further comprise a switching network and a dissipation resistor, wherein the controller is configured to operate the switching network such that energy from the motor is selectively dissipated with the dissipation resistor or used to charge the energy storage when the energy storage is not fully charged. The switching network may comprise six switch elements arranged in an H-bridge configuration. The switch elements may comprise IGBTs or MOSFETs.

The electric motor system may further comprise a power rectifier (218). The power rectifier may comprise a full wave diode rectifier.

The driven object may comprise an aircraft spoiler panel (216) on an aircraft wing (265). The neutral position (234) may be a position in which the spoiler panel (216) is about four degrees from the wing surface (227). The driven object may comprise a turbine blade (316) driven about a pitch axis (396) on a power generating turbine (310). The motor may comprise a turbine blade pitch control motor. The neutral position may be a turbine blade feathered position.

The position sensor may comprise an encoder, a resolver or a LVDT. The power sensor may comprise a voltage sensor or an FPGA validity sensor. The power supply may comprise a three phase AC power supply.

The electric motor system may further comprise an output filter (272). The output filter may comprise a common mode filter (273) or a differential mode filter (274). The electric motor system may further comprise an input filter (252). The input filter may comprise a common mode filter (253) or a differential mode filter (254). The electric motor system may further comprise a soft start switch (SW1).

In another aspect, a method of driving an electric motor interface is provided comprising the steps of providing an external power supply input, providing a position sensor signal input, providing a switching network having switch gates, providing an electric motor interface for connecting to an electric motor, providing a controller, providing an energy storage interface, monitoring the external power supply input, and operating the switch gates to absorb power from the electric motor interface as a function of the position sensor input and the external power supply input.

The step of operating the switch gates may comprise operating the switch gates to absorb power from the electric motor interface when power supply input drops below a voltage threshold and the position sensor signal input is below a position threshold.

The method may further comprise the step of providing a dissipation resistor interface. The method may further comprise the step of selectively directing the absorbed power to the energy storage interface or the dissipation resistor interface as a function of whether the energy storage interface is fully charged.

The method may further comprise the step of using power from the energy storage interface to actively brake the electric motor as a function of the position sensor input and the external power supply input. The step of using power from the energy storage interface to actively brake the electric motor may comprise actively braking the electric motor when the rate of change of the position sensor input signal is below a speed threshold, the power supply input drops below a voltage threshold, and the position sensor signal input is below a position threshold. The step of operating said switch gates may comprise operating the switch gates to absorb power from the electric motor interface when the rate of change of the position sensor input signal is above a speed threshold, the power supply input drops below a voltage threshold, and the position sensor signal input is below a position threshold. The method may further comprise the step of providing a dissipation resistor interface. The method may further comprise the step of selectively directing the absorbed power to the energy storage interface or the dissipation resistor interface as a function of whether the energy storage interface is fully charged.

The local energy storage interface may be configured to connect to a capacitor or a battery. The method may further comprise the steps of providing a power rectifier and converting an AC voltage on the power supply input into a DC voltage. The power rectifier may be a full wave diode rectifier. The method may further comprise the step of providing a soft start switch. The position sensor signal input may be configured to connect to an encoder, a resolver or a LVDT.

The electric motor interface may be configured to connect to an aircraft wing spoiler actuator. The electric motor interface may be configured to connect to a wind turbine pitch control motor.

The external power supply input may be configured for a three phase AC power source. The method may further comprise the steps of filtering the signal coming in on the external power supply input or filtering a signal going out on the electric motor interface. The method may further comprise the step of providing a brake actuator interface.

In another aspect, a driver for an electric motor is provided comprising an external power supply input, a power sensor having an output and configured to monitor the external power supply input, a position sensor having an output, an AC to DC power rectifier, a switching network having switch gates, an electric motor interface for connecting to an electric motor, a control configured to monitor the power sensor output and the position sensor output and configured to operate the switch gates, a local energy storage interface for temporarily supplying power, wherein the control is configured to operate the switch gates such that a recovered power is drawn from the electric motor interface as a function of the power sensor output and the position sensor output.

The driver may further comprise a dissipation resistor interface. The control may be configured to direct power from the electric motor interface to the dissipation resistor interface. The control may be configured to operate the switching network such that energy from the motor interface is selectively directed to the dissipation resistor interface or the local energy storage interface when a local energy storage connected to the local energy storage interface is not fully charged.

The control may be configured to direct power from the electric motor interface to the local energy storage interface. The driver may further comprise a brake actuator interface. The control may be configured to operate the switching network such that energy from the local energy storage interface is directed to the brake actuator interface.

The switching network may comprise six switch elements in an H bridge configuration. The switch elements may comprise IGBTs or MOSFETs.

The control may be configured to selectively actively brake, dynamically brake or regeneratively brake a motor connected to the electric motor interface. The control may be configured to operate the switching network such that energy from the motor interface is selectively directed to the dissipation resistor interface or the local energy storage interface when a local energy storage connected to the local energy storage interface is not fully charged.

The driver power rectifier may contain a full wave diode rectifier. The driver may further comprise an output filter. The output filter may comprise a common mode filter or a differential mode filter. The driver may further comprise an input filter. The input filter may comprise a common mode filter or a differential mode filter. The driver may further comprise a soft start switch.

DETAILED DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

The following definitions are provided for interpretation of the embodiments described herein. Dynamic braking is the process of connecting or "shorting", such as with a dissipation resistor for example, the input terminals of the electric motor causing motor kinetic energy to be converted to heat and thus slowing the motor down.

Regenerative braking is the process of transferring energy from an electric motor (typically motor or system kinetic energy) to an energy storage device by allowing current to be driven by the motor back into the energy storage device.

Active braking is the process of using a power supply to drive either an electric motor in opposition to its current direction of rotation, or to drive a separate brake actuator coupled to a motor.

Coasting is the process of electrically disconnecting an electric motor's input terminals, allowing their voltage to float, and preventing electrical energy from entering or exiting the motor through the input terminals.

A switch network is a set of electrical or mechanical devices for controlling the flow of electrical current between at least two terminals, examples of which include an IGBT H-bridge, a MOSFET H bridge, a relay bridge, or other similar devices.

A control or controller is a digital device which has output lines that are a logical function of its input lines, examples of which include a microprocessor, microcontroller, field programmable gate array, programmable logic device, application specific integrated circuit, or other similar devices.

A power sensor is an electrical or mechanical device for measuring the power of an electrical system, examples of which include a voltage sensor, a current sensor, a device having both voltage and current sensors, or other similar devices.

A brake switch is a device which controls the flow of electricity to a braking mechanism, examples of which include a general purpose transistor, an IGBT, a MOSFET, a relay, or other similar mechanical or semiconductor devices.

A power supply is a source of either AC or DC electrical power.

A position sensor is an electrical device for measuring the position, or a derivative of position, or distance from an object, examples of which include an encoder, a resolver, a linear variable differential transformer, a variable resistor, a variable capacitor, a laser rangefinder, an ultrasonic range detector, an infrared range detector, or other similar devices.

An energy storage is a device or system for storing energy, examples of which include a capacitor, a battery, an inductor, a flywheel, or other similar devices.

Figure 1:
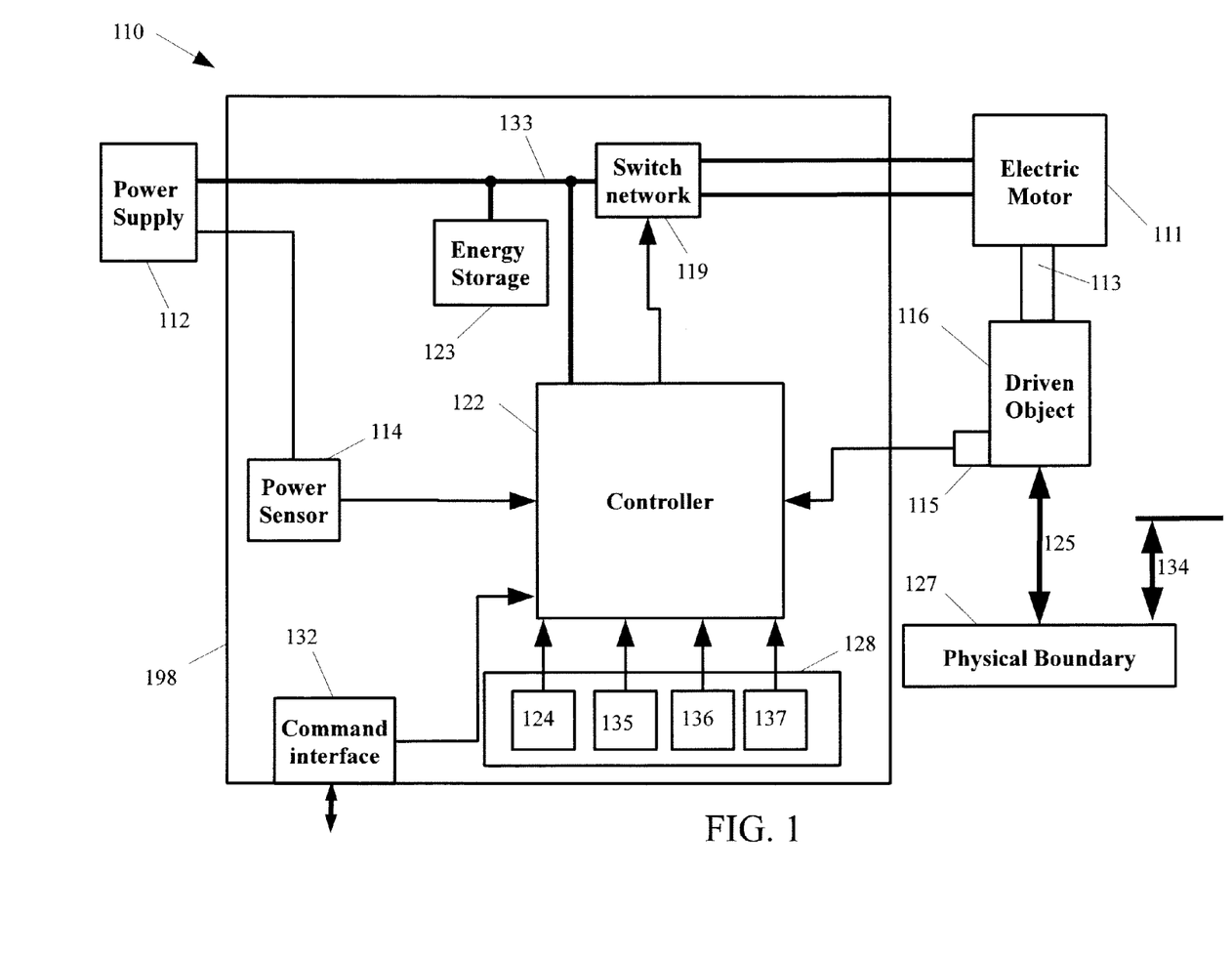
FIG. 1 is a high level object diagram of a first general embodiment of the motor system.

Referring now to the drawings, and more particularly to FIG. 1, this invention provides a motor system, of which a first embodiment is indicated at 110. As shown, motor system 110 generally includes power supply 112, power sensor 114, energy storage 123, controller 122, switch network 119, electric motor 111, driven object 116, and physical boundary 127.

Power supply 112 provides electrical power to the system. In this embodiment, power supply 112 is DC. However, an AC power supply may be used as an alternative. Power supply 112 is connected to local energy storage 123.

In this embodiment, energy storage 123 is a capacitor. Alternatively, a battery or inductor may be used. The power delivered by power supply 112 is measured by power sensor 114. In this embodiment, power sensor 112 is a voltage sensor. However, a current sensor may be used as an alternative.

Energy storage 123 connects to switch network 119 through common power line 133. Switch network 119 controls flow of power to, from and between the terminals of electric motor 111. Switch network 119's operation is governed by a control input connected to controller 122. Switch network 119 is configured to connect the terminals of electric motor 111 to one another to dynamically brake electric motor 111. In this embodiment, switch network 119 is constructed from IGBTs. However, relays or MOSFETs may be used to construct switch network 119 as an alternative.

Electric motor 111 is mechanically coupled to driven object 116 through actuator 113. Actuator 113 may contain gears, a screw drive or other similar devices. Object 116 has a range of possible motion, potentially limited by physical boundary 127. Also, within object 116's range of motion is a substantially neutral range or position 134. When object 116 is at rest in neutral range 134, object 116 is not as inclined to move. Object 116 is more likely to experience external forces acting upon it when its position is outside neutral range 134.

Position sensor 115 measures distance 125 between object 116 and physical boundary 127. In this embodiment, position sensor 115 is a Linear Variable Differential Transformer ("LVDT"). However, an encoder, resolver, laser rangefinder, ultrasonic range detector, variable resistor, infrared range detector or other similar device may be used as alternatives.

Position sensor 115 is connected to controller 122. In this embodiment, controller 122 is a Field Programmable Gate Array ("FPGA"). However, a programmable logic device ("PLD"), microprocessor, microcontroller or other similar device may be used as alternatives. Controller 122 has an input to receive position sensor 115's output signal, and an input to receive power sensor 114's output signal. Controller 122 also controls the control line connected to switch network 119. The control line to switch network 119 may be a single wire, a plurality of wires or wireless. Also connected to controller 122 is command interface 132. Memory 128 stores the values for several operating variables, including neutral range upper value 124, power source threshold 135, neutral position threshold 136, and energy storage threshold 137. Controller 122 is programmed to operate as described below.

In the event of a power supply failure, system 110 brakes driven object 116 when it is in a safer position. More specifically, when a failure of power supply 112 occurs, switch network 119 is configured to dynamically brake electric motor 111 when driven object 116 is close to or within neutral range 134. Since energy storage 123 may only have enough energy to temporarily control switch network 119, controller 122 is configured to control switch network 119 to dynamically brake only when both a power supply failure occurs and when driven object 116 is close to or within neutral range 134.

As described above, object 116 has a range of motion which may be limited by physical boundary 127. If object 116 contacts physical boundary 127 with too much force, physical boundary 127 and driven object 116 may be damaged. Such a collision may also damage motor 111 or actuator 113. If power to electric motor 111 is cut while driven object 116 is in motion, driven object 116 may coast, potentially colliding with physical boundary 127. Also, even if driven object 116 is not moving when power to motor 111 is lost, if object 116 is not in neutral range 134 it may end up being accelerated by external forces and contact boundary 127 with excessive force.

As shown in FIG. 1, energy storage 123 is connected to power supply 112 along common power line 133. While power supply 112 is functioning properly, energy storage 123 is charged to the voltage of power supply 112. In the event of a power supply failure, energy storage 123 will temporarily maintain the voltage on common power line 133 while energy is drawn by controller 122 and switch network 119.

Controller 122 receives the power it needs to operate from common power line 133. Controller 122 has internal sensors to monitor the voltage level on common power line 133. Common power line 133 also provides electrical power to switch network 119. Power for electric motor 111 is provided indirectly by common power line 133 through switch network 119.

The voltage of power supply 112 is measured by power sensor 114, and the output from power sensor 114 is read by controller 122. Position sensor 115 measures distance 125 between object 116 and boundary 127, and the output of position sensor 115 is read by controller 122.

Controller 122 sends control signals to switch network 119. For example, a forward control signal will cause switch network 119 to connect motor 111 to power line 133 in a way to cause motor 111 to move forward. Similarly, a reverse control signal will cause switch network 119 to connect motor 111 to power line 133 in such a way to cause motor 111 to move in reverse. A regenerate signal will cause electric motor 111's drive terminals to be connected in such a way that energy is absorbed from the electric motor and stored in power supply 123. A coast signal will cause switch network 119 to disconnect motor 111's drive terminals, and allow their voltage to float. A dynamic brake signal will cause electric motor 111's drive terminals to be connected to each other such that motor kinetic energy is dissipated as heat. By rapidly switching between the coast signal and the forward, reverse, or regenerate signal, controller 122 can adjust the time averaged drive or regeneration level of motor 111. As an alternative, it may be advantageous to combine coast and regenerate into a single mode through the specific circuit implementation of switch network 119 (for example if an IGBT bridge with freewheeling diodes is used). Motor 111 can be braked in multiple ways, including by configuring motor 111 to regenerate energy into energy storage 123, by driving motor 111 in opposition to its direction of rotation (in either forward or reverse as appropriate), or through dynamic braking.

A feedback loop is created between position sensor 115, controller 122, switch network 119, motor 111 and driven object 116. Under normal operation, controller 122 adjusts the control signal to switch network 119 in order to make position sensor 115's output match a desired set point. A sensor separate from position sensor 115 may be alternatively used for the feedback loop, such as a resolver connected to motor 111.

Command interface 132 provides controller 122 with high level position or movement commands. For example, command interface may command controller 122 to move driven object 116 to a specific position. As the command at interface 132 changes, controller 122 will adjust the desired set point, and in turn change the control signal sent to switch network 119.

Controller 122 determines when a power supply failure occurs by comparing power sensor 114's reading to power threshold 135. If power sensor 114's output is less than power threshold 135, a power failure is determined. In the event of a power failure, only a limited supply of power is available in energy storage 123, which can be used to power controller 122, operate switch network 119 or activate motor 111. When energy storage 123's energy is depleted, the voltage on common power line 133 will drop, and motor 111, switch network 119 and controller 122 can not function.

When power sensor 114's reading drops below power threshold 135, controller 122 will stop responding to commands from interface 132 and will send the coast signal to switch network 119, such that motor 111 will not consume any energy, and switch network 119 will consume minimal energy.

The controller will next intelligently determine when to brake motor 111 so that the chance of object 116 hitting boundary 127 is minimized. More specifically, braking will be activated only when power supply 112 has less than the threshold voltage, and position sensor 115 indicates object 116 is within a threshold 136 of neutral range 134. Controller 122 compares position sensor 115's output with neutral range's upper value 124 and determines if object 116's position is within threshold 136 of neutral range 134. This is accomplished by determining if the absolute value ("ABS") of the difference of position sensor 115's output and neutral range upper value 124 is greater than position threshold 136. Controller 122 also measures the voltage on common power line 133 and prevents activation of dynamic braking if common power line 133's voltage is below energy storage threshold 137. In summary, controller 122 evaluates the logic function:

```
IF (power sensor 114's output < power source threshold 135)
AND (common power line 133's voltage > energy storage
threshold 137)
AND (ABS (position sensor 115's output - neutral range upper
value 124) < position threshold 136))
THEN send braking signal to switch network 119.
```

The braking signal used in this embodiment is the dynamic braking signal. As a first example of system 110 operation, consider a power supply 112 failure when object 116 is far from neutral range 134. In this case, controller 122 will detect that power sensor 114's output has dropped below power source threshold 135. However, since position sensor 115's output indicates that distance 125 between object 116 and neutral range upper value 124 is greater than neutral position threshold 136, controller 122 will not send the dynamic braking signal to switch network 119. Thus, energy within energy storage 123 will not be depleted by switch network 119 at this time. Object 116 may now begin to accelerate towards boundary 127 due to external forces. Brake switch 131 will not be activated until object 116 comes within position threshold 136 of neutral position 134. After brake switch 131 is activated, energy storage 123 will provide power to active brake 129, which will both rapidly stop motion of object 116 and begin to rapidly deplete the energy in energy storage 123.

By configuring controller 122 to wait until object 116 is close to neutral range 134 before activating the brake, energy storage is not depleted when object 116 is in a dangerous (non-neutral) position. Since the brake is activated when object 116 is near neutral range 134, object 116 should remain substantially at rest when stopped and further power will not be needed to brake object 116.

Contrary to how system 110 operates, if braking were activated immediately upon power loss while object 116 was far from neutral range 134, object 116 would come to a stop outside range 134. But once energy storage 123 was depleted, controller 122 and switch network 119 would no longer function, braking would no longer be applied, and because object 116 was not in neutral range 134, object 116 would begin to be accelerated by external forces, potentially contacting boundary 127 with excessive force.

As a more specific example, system 110 may be utilized to control the braking in an electric trolley car. In this example, the electric vehicle is driven object 116 and position sensor 115 is a gyroscope indicating the slope or incline of the trolley car relative to horizontal. Neutral range 134 is when the trolley car is on a track with close to no incline (−3 degrees to +3 degrees angular slope). Power supply 112 is the electric trolley wires running above the trolley track. The electric trolley car has a small emergency battery as energy storage 123.

Consider the case where the trolley wires running above the track are suddenly cut while the trolley car is moving. The emergency battery only has enough energy to brake the trolley car once. In this case, the system monitors the slope of the track, and only brakes when the slope is close to zero. When the trolley car reaches a flat section of the track, the brakes are engaged using power from the battery, and the trolley car stopped. Since the trolley car is stopped on a flat section of track, it will remain at rest even if the battery is depleted.

If the brakes were engaged while the trolley car was on a hill, the car would come to a stop on the hill. Once the battery was depleted, the brakes would stop working. Since the car is still on a hill, it would begin to accelerate, potentially passing through a flat section of the track and hitting a physical barrier.

System 110 may be modified to use braking schemes other than just dynamic braking. For example, regenerative braking can be used at high rotation speeds to transfer system kinetic energy into energy storage 123. However, regenerative braking may not work well at low motor speeds. At low speeds, motor 111 may be actively braked by driving motor 111 in the direction opposite of rotation with a forward or reverse signal provided as appropriate to switch network 119. Such counter driving of motor 111 is appropriate for low rotation speeds where dynamic and regenerative braking does not work effectively. Additionally, a separate brake system could be coupled to motor 111 and could be actively turned on when braking is desired.

Furthermore, when dynamic braking, instead of merely shorting motor 111's terminals together to cause heat to be dissipated in the internal resistance of motor 111, a dissipation resistor may be used. In such a configuration, when dynamic braking is desired, motor 111's terminals are connected across a dissipation resistor, which is configured to transfer system kinetic energy into heat. A dissipation resistor may be configured to dissipate energy more rapidly than motor 111's coils.

Figure 2:
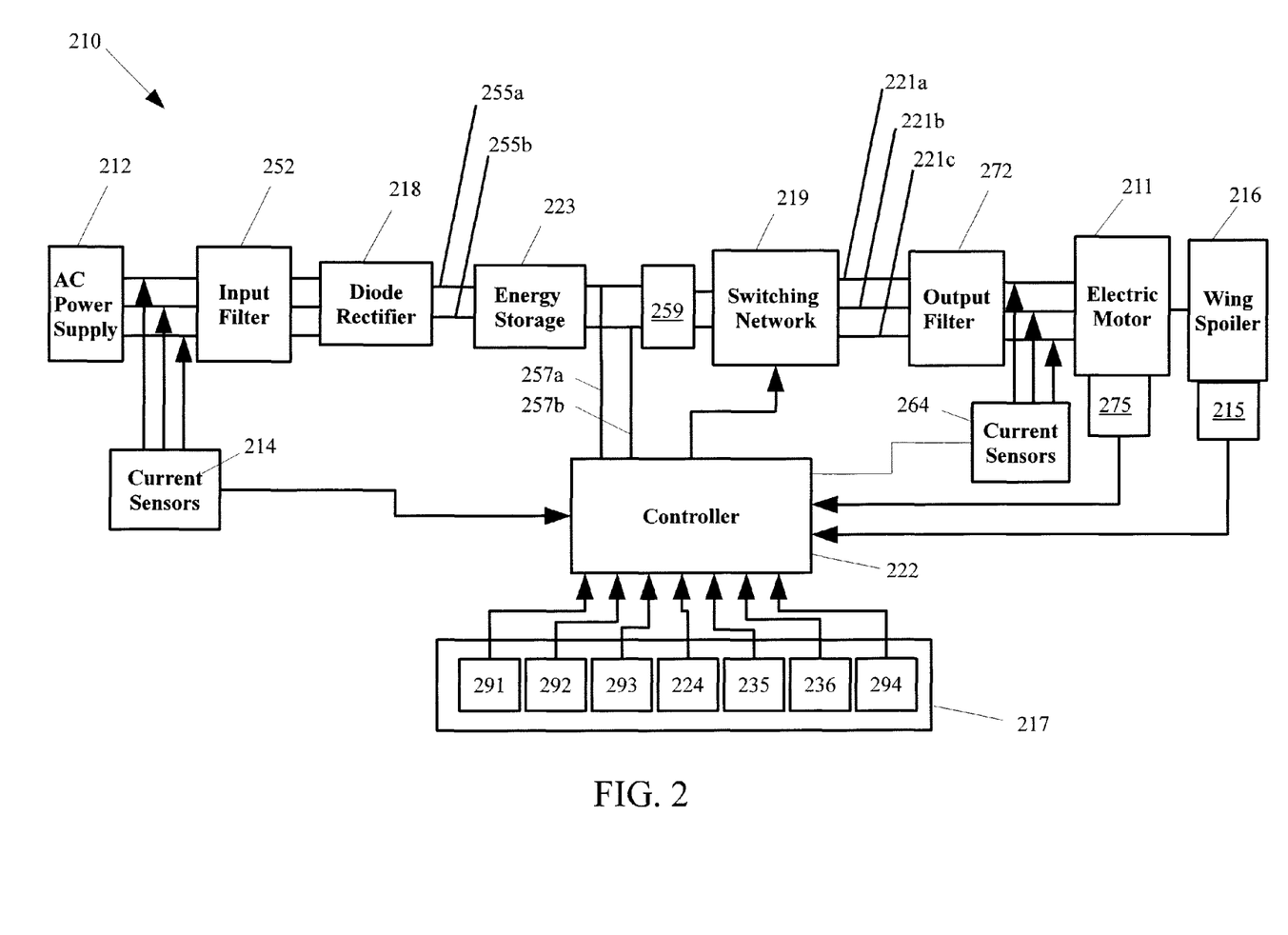
FIG. 2 is a high level object diagram of a second aircraft wing spoiler control embodiment of the motor system.

FIG. 2 is a high level object diagram showing second embodiment 210 of an electric motor system, particularly configured for use with an aircraft wing spoiler system. As shown in FIG. 2, system 210 has several features not shown in system 110. AC power supply 212 connects to input filter 252. Current sensors 214 are arranged to measure current passing from AC power supply 212. Input filter 252 connects to diode rectifier 218, which connects to energy storage 223. Coupled to switching network 219 is power dissipator 259. The DC lines coming from energy storage 223 are sampled by lines 257a and 257b, which connect to controller 222. Power dissipator 259 is arranged across the DC lines between energy storage 223 and switching network 219. Switching network 219 provides three phases 221a, 221b and 221c, which pass through output filter 272 before going to electric motor 211. Switching network 219 receives its gating signals from controller 222 as shown. The current passing through phase lines 221a, 221b and 221c is measured by current sensors 264. Resolver 275 is coupled to motor 211. Motor 211 connects to wing spoiler 216 through actuator 228 (shown in FIG. 4). Position sensor 215 is mounted on wing spoiler 216. Resolver 275 and position sensor 215 provide their output signals to controller 222. Memory 217 stores several parameters for controller 222. Stored parameters include DC threshold 291, minimum regeneration speed 292, dynamic braking current threshold 293, neutral position value 224, power threshold 235, and neutral position threshold 236.

Figure 4:
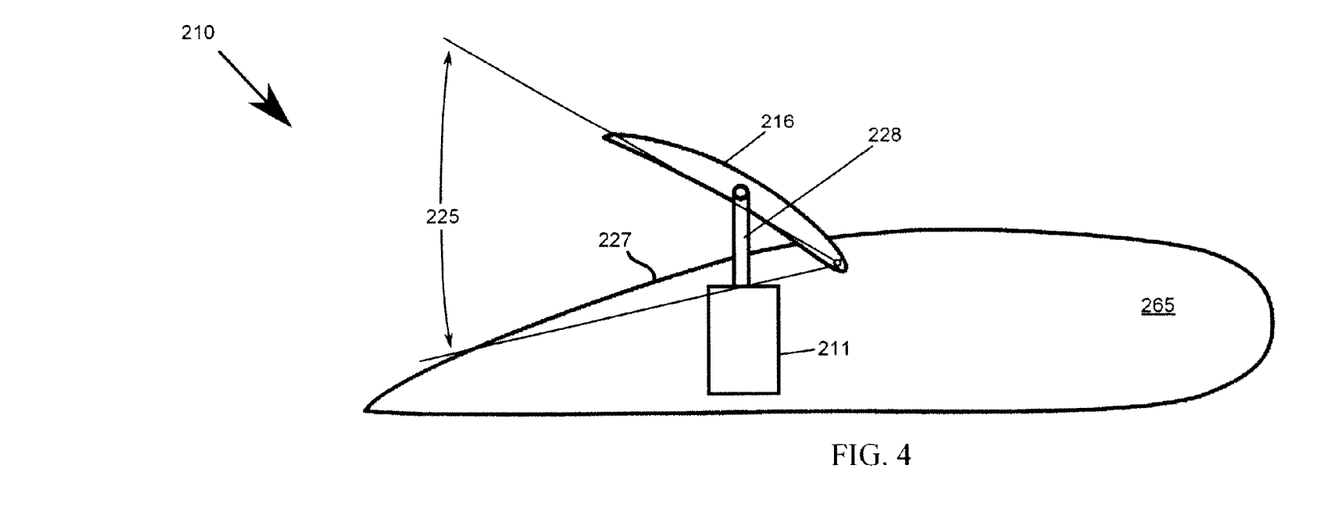
FIG. 4 is a side view of the wing spoiler system shown in FIG. 2.
Figure 5:
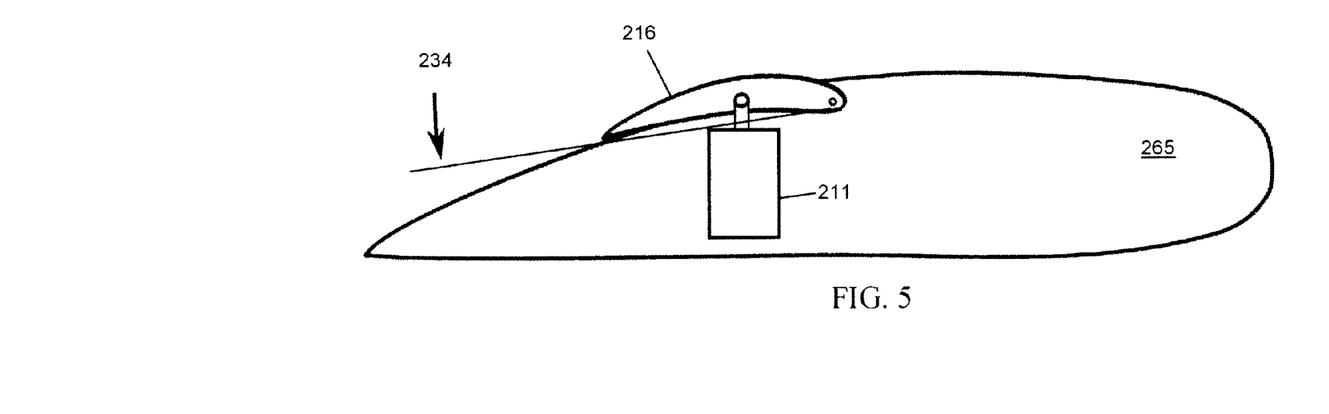
FIG. 5 is a side view of the wing spoiler system shown in FIG. 2 in a neutral position.

FIG. 4 shows the physical layout of system 210 in aircraft wing 265. Electric motor 211 is mechanically coupled through actuator 228 to wing spoiler 216 to control position 225. As discussed below, system 210 is configured to prevent spoiler 216 from contacting wing surface 227, or actuator 228's physical limits, with excessive force. FIG. 5 shows system 210 when wing spoiler 216 is in neutral position 234.

Figure 3:
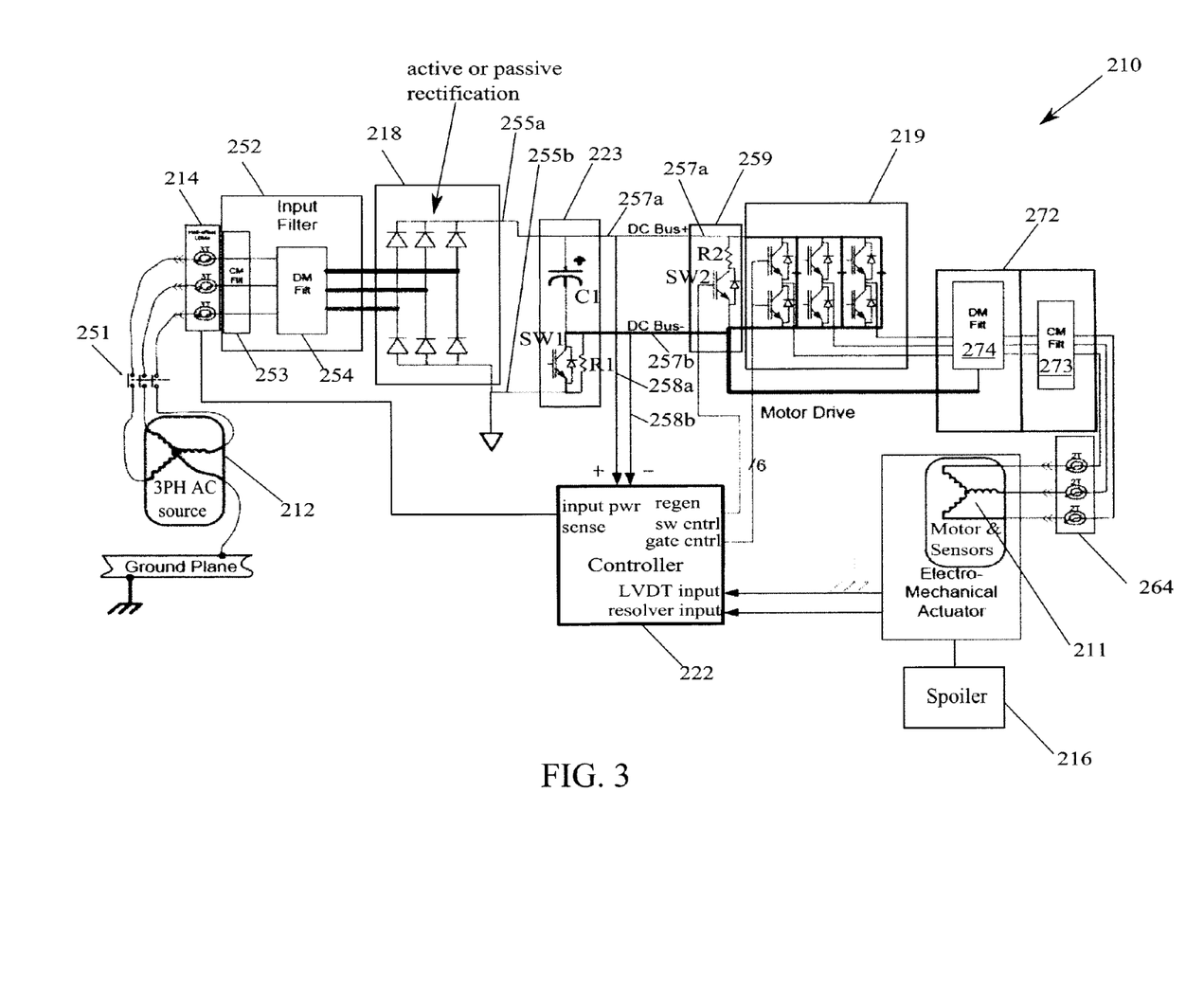
FIG. 3 is a schematic diagram of the aircraft wing spoiler system shown in FIG. 2.

FIG. 3 is an electrical block diagram of system 210 showing more implementation details of the FIG. 2 block diagram. AC power source 212 is a three phase AC source connecting to a three wire power line. Power source switch 251 is arranged in series with the power lines, and connects or disconnects each phase (wire) from source 212 to the rest of the system. Current sensors 214, arranged on the power lines, are implemented as hall effect current sensors. Current sensors 214 each have an output signal connected to controller 222 which provide the magnitude of current in its respective phase of the power line. As shown in FIG. 3, the power line connects to input filter 252. Filter 252 has common mode filter stage 253 and differential mode filter stage 254. The power line next connects to rectifier 218.

As shown in FIG. 3, rectifier 218 is implemented as a full wave diode rectifier with six diodes. However, either active or passive voltage rectification implementations may be used as those skilled in the art will recognize. Rectifier 218 converts the three phase AC power to a DC signal having two DC rails, including positive rail 255a and negative rail 255b. The DC rails 255a and 255b connect to energy storage 223. Energy storage 223 is implemented with capacitor C1 connected in series with soft start switch SW1 across DC rails 255a and 255b, as shown. Positive DC bus line 257a is connected to positive DC rail 255a. Negative bus line 257b is connected to the terminal between capacitor C1 and switch SW1. The voltage of DC bus lines 257a and 257b are monitored by controller 222 through voltage sense lines 258a and 258b, as shown.

Power dissipator 259 is connected across DC bus lines 257a and 257b. Power dissipator 259 comprises power dissipation resistor R1 connected in series to switch SW2 across DC bus lines 257a and 257b. Connected in parallel with power dissipater 259 is switch network 219.

In this embodiment, switch network 219 is implemented as a six IGBT H bridge with three capacitors, as shown. However, those skilled in the art will recognize that different switch network implementations may be readily substituted with the implementation shown. Each switch gate is connected to and controlled by controller 222. Switch network 219 provides a three phase output which is connected to output filter 272. Output filter 272 has differential mode filter stage 274 followed by common mode filter stage 273.

As shown in FIG. 3, current sensors 264 are connected to the output power lines coming from output filter 272. Current sensors 264 are implemented as hall effect current sensors and provide their signals to controller 222. The output power lines are connected to the three terminals of electric motor 211. Electric motor 211 is a three phase DC motor. Electric motor 211 is mechanically coupled to wing spoiler 216 through an actuator which has mechanical linkages and gearing.

Figure 6:
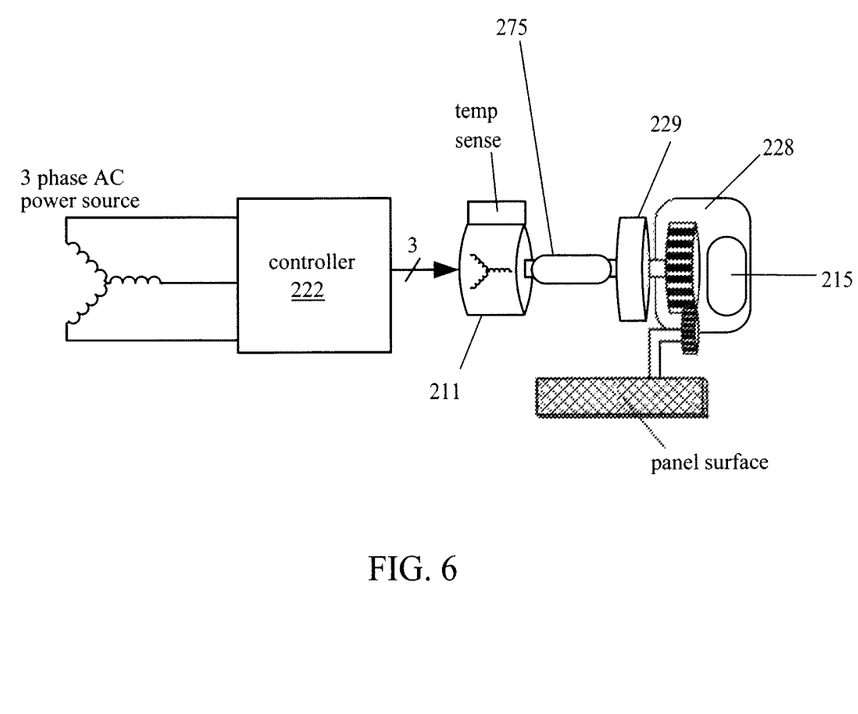
FIG. 6 is an object diagram of the internal physical arrangement of the aircraft wing spoiler system shown in FIG. 2.

FIG. 6 shows another view of how motor 211 is coupled to spoiler 216's panel surface. Resolver 275, arranged on motor 211's output shaft, measures the angle of rotation of motor 211's rotor. LVDT 215, arranged on the mechanical linkages between motor 211 and spoiler 216, effectively measures the position of spoiler 216 relative to aircraft wing 265. As shown in FIG. 4, LVDT 215 measures distance 225 between spoiler 216 and wing surface 227. Referring back to FIG. 3, controller 222 receives input signals from LVDT 215 and resolver 275. Controller 222 is programmed to operate as described below.

In general, system 210 will intelligently dynamically brake electric motor 211 in the event of a power failure in order to minimize the chance that spoiler 216 contacts either wing surface 227 or the system's mechanical stops with excessive force. More specifically, since energy storage 223 may only have enough energy to temporarily dynamically brake the system, controller 222 is configured to dynamically brake the system only in the event of a power supply failure and when spoiler 216 is close to wing surface 227. When spoiler 216 is stopped close to wing surface 227, it is in a generally neutral position and is less likely to be accelerated by wind forces across wing 265 when in flight. Once energy storage 223 is depleted, controller 222 and switch network 219 can no longer be powered, and thus motor 211 can not be dynamically braked. By waiting until spoiler 216 is close to wing surface 227 before dynamically braking, the chance that spoiler 216 is left in a dangerous non-neutral position when local power supply is depleted is reduced.

As shown in FIG. 3, external power source 212 is a three phase AC source. Connection of power source 212 to the rest of the system is controlled by power source switch 251. Once switch 251 is on, current sensors 214, which were previously sensing zero current, begin to sense current flowing to the rest of the system. Filter 252 removes common mode and differential mode noise coming in on the power lines from electromagnetic interference or other noise sources.

Rectifier 218 converts the AC power coming out of filter 252 into a DC power source. Switch SW1 in parallel with R1 acts as a soft start mechanism. Switch SW1 is default off (non-conducting) when the system is powered off. Since SW1 is off, current flows through R1 to slowly charge C1. After a delay, after C1 has substantially charged, SW1 is switched on causing current to bypass R1, which will no longer be dissipating energy. Switch SW1 stays on during normal operation. By the delay in turning switch SW1 on, at power-on current surging is minimized.

Switch network 219 draws electrical power from DC bus lines 257a and 257b. Switch network 219 is controlled by controller 222 to operate in at least three different modes: regenerating, active driving and dynamic clamping. During active driving, controller 222 utilizes pulse width modulation, i.e. controller 222 pulses on and off the switches in switch network 219 in order to produce a desired drive current signal for each of motor 211's three terminals. In this way, motor 211 can be driven in forward or reverse with a controlled torque or speed.

During regeneration, controller 222 causes each of the switches in switch network 219 to be off. Due to the orientation of the diodes in switch network 219, while in this mode current can only flow from the motor coils to regeneratively charge into DC bus line 257a, returning from negative DC bus line 257b. If motor 211's speed is slow enough that the back-EMF is less than the DC Bus voltage, regenerative current will not flow to any significant degree between motor 211's coils and switch network 219. However, if the motor speed increases to a rate such that the back-EMF exceeds the DC Bus voltage, current will flow between motor 211, switch network 219, and the DC bus. While the back-EMF is greater than the DC bus voltage, the system will be regeneratively braking, transferring motor 211's kinetic energy into the DC bus, where it will be captured as electrical energy by energy storage 223. This automatic regenerative braking will continue until the back-EMF no longer exceeds the DC bus voltage.

Controller 222 actively monitors the DC bus voltage through voltage sense lines 258a and 258b. If the DC bus voltage exceeds a set threshold, switch SW2, which is normally off, is switched on, causing current to flow from positive DC bus line 257a through dissipation resistor R2, through switch SW2 and to negative DC bus line 257b reducing the DC bus voltage potential. This threshold is set to prevent the DC bus voltage exceeding a safe limit, which could otherwise cause damage to energy storage 223 or other system components. Turning on switch SW2 causes energy to be dissipated from the DC bus as heat in resistor R2. Energy dissipated in R2 may come from energy storage 223, motor 211, or a combination of the two.

During the dynamic clamping mode, controller 222 turns on all of the top switches (or alternatively all of the bottom switches) in switch network 219, causing the three motor coils 211 to effectively short circuit each other. If motor 222 is rotating when switch network is placed into the dynamic clamping mode, the back-EMF produces a rapid current flow through the short circuited coils. This current flow creates a motor torque in the direction opposing rotation, which rapidly decelerates the motor. Energy is dissipated primarily as heat in the internal resistance of motor 211's coils and the resistance of the current path. During dynamic clamping, even though motor 211 is not drawing power from the DC bus, controller 222 is. The power to switch the switches in switch network 219 and to keep the switches open is also provided by the DC bus. During dynamic clamping, if there is a loss of power from AC source 212, energy storage 223 is depleted as controller 222 and switch network 219 draw power from the DC bus. Thus, given the size of energy storage 223, dynamic clamping can only be maintained until this stored energy is depleted following the loss of external AC power 212.

In the event of a failure of power supply 212, the failure is sensed in the output signals of current sensors 214 read by controller 222. Upon sensing the failure of AC power supply 212, controller 222 commands switch network 219 to enter the regenerative mode by turning off all switches in switch network 219. This minimizes the power draw from the DC bus, and allows motor regenerative energy to supply energy storage 223. Controller 222 now monitors position sensor 215 to determine if motor 211 should be dynamically braked. More specifically, controller 222 follows a logic function:

> IF (current sensor 214's output < power source threshold 235)
> AND (ABS(position sensor 215's output - neutral position value 224) < position threshold 236))
> THEN place switch network 219 into dynamic braking mode.

In this way, dynamic braking, which increases drain on energy storage 223, is delayed until position sensor 215 indicates that wing spoiler 216 is in a neutral position (e.g. when spoiler is less than 4 degrees extended). The above logic function is evaluated at a sample rate of approximately 2 kHz.

As an example, consider an external AC power failure occurring when spoiler 216 is extended 40 degrees. A neutral position threshold 236 of 4 degrees is used, since this provides sufficient proximity to the neutral position value 224 (zero degress) to allow spoiler 216 to come to a stop when braked, and also is close enough to neutral position 224 that spoiler 216 will not be accelerated by wind forces when in this range. Controller 222 senses the loss of external AC power and immediately places switch network 219 into regenerative mode by switching off all switches in switch network 219. Controller 222 next begins to iteratively monitor spoiler position sensor 215. Since position sensor 215 will first indicate to controller 222 that spoiler 216 is extended 40 degrees, controller will calculate that position sensor output 215 (40 degrees) is greater than position sensor threshold 224 (four degrees) more than neutral position value 224 (zero degrees). Controller 222 will continue this comparison, leaving switch network 219 in the coast mode as long as position sensor 215's output is greater than four degrees. Meanwhile, since switch network 219 is in regenerative mode, allowing motor 211 to coast, spoiler 216 is accelerated toward wing surface 227 by wind forces. During this time, energy storage 223 is increased due to regenerative current flow. In this mode, neither switch network 219 nor motor 211 are consuming power from energy storage 223.

Once spoiler 216 comes within four degrees of wing surface 227, controller 222 detects this from position sensor 215's output, and places switch network 219 into dynamic brake mode. The upper switches in switch network 219 are all closed, short circuiting motor 211's coils, causing motor 211 to rapidly decelerate to a low speed as kinetic energy is dissipated as heat within the coils. Since switch network 219 has its upper switches on in the dynamic clamping mode, it draws power from the DC bus, and increases the depletion rate of energy storage 223. When energy storage 223 is depleted beyond the ability to provide minimally necessary internal power, spoiler 216 is in a safer position (i.e. spoiler 216 is not contacting wing surface 227 and the actuator has not exceeded the mechanical stop limits). The system has now been brought from a less safe condition (external AC power loss when spoiler in a non-neutral position) to a safer condition (spoiler in a substantially neutral state).

By not immediately dynamically braking the system in a power loss, the chances that the system comes to rest in a safer condition are significantly increased. In the scenario above, AC power was lost when spoiler 216 was extended 40 degrees. If dynamic braking were initiated when power was first lost, energy storage 223 would deplete at a higher rate and no increase in energy storage 223 from motor regeneration would occur. While spoiler 216 would be immediately braked, spoiler 216 would still be extended about 40 degrees, a non-neutral position, when brought to rest. Spoiler 216 would remain close to this 40 degree position while it was dynamically braked, until energy storage 223 became depleted. With energy storage 223 depleted, controller 222 and switch network 219 will no longer function. Thus, motor 211 will no longer be dynamically clamped. Spoiler 216 would now be forced by aero loading to accelerate downward from its position of about 40 degrees. With a relatively large distance to accelerate, spoiler 216 could contact wing surface 227 with excessive force, causing damage to wing surface 227, spoiler 216, motor 211 and/or the mechanical stops and linkages between these parts.

Also, by not immediately braking upon power loss, any momentum that the system has upon power loss may be utilized to bring the system closer to a neutral position. For example, if spoiler 216 is actively retracting during the power loss, it will continue to retract, approaching the neutral position until controller 222 dynamic brake logic is satisfied.

In addition to dynamic braking as described, as shown in FIG. 6 system 210 may be modified to activate brake 229 at the same time dynamic braking is engaged. However, since brake 229 may require significantly more energy than dynamic braking does, the capacity of energy storage 223 should be adjusted accordingly if this mode of operation is utilized.

Figure 7:
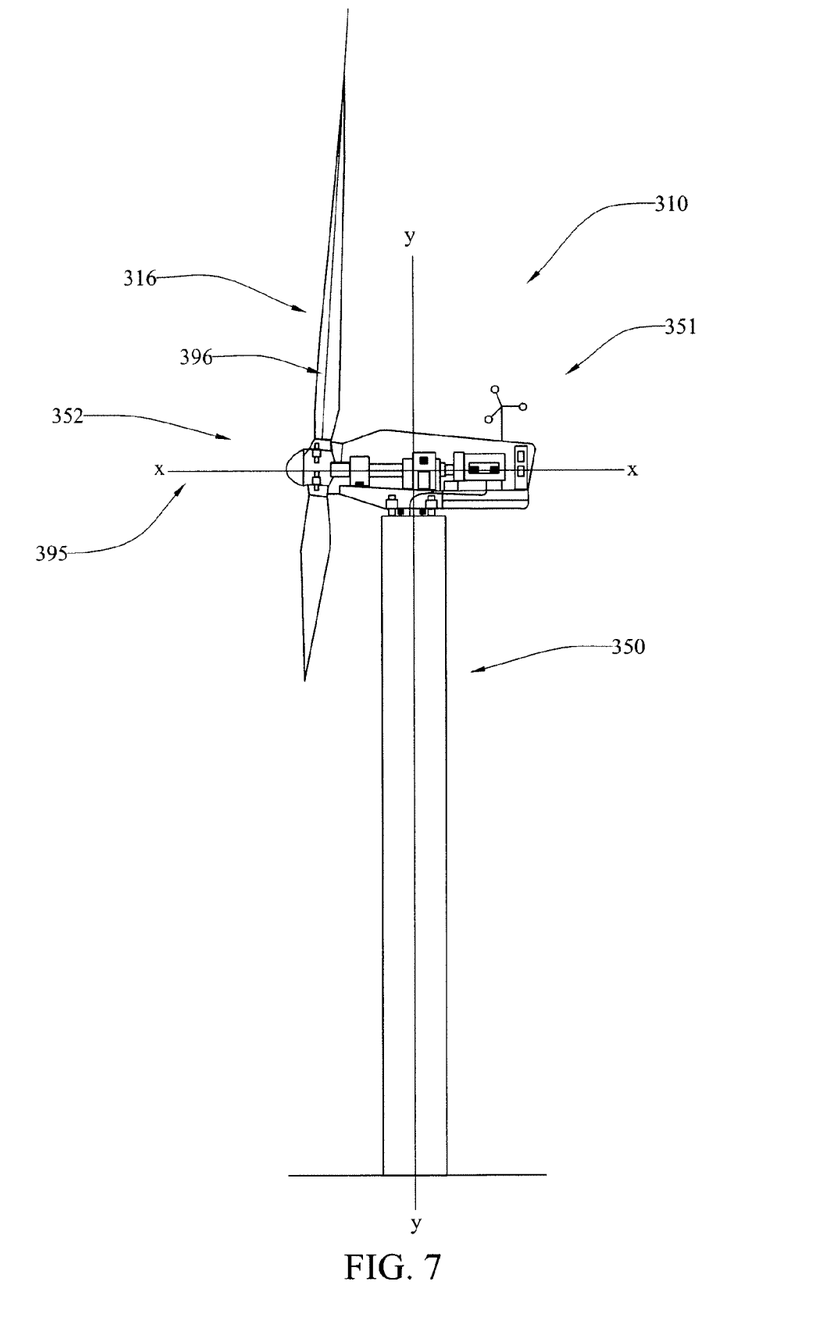
FIG. 7 is a perspective view of a third wind turbine pitch control embodiment of the motor system.
Figure 8:
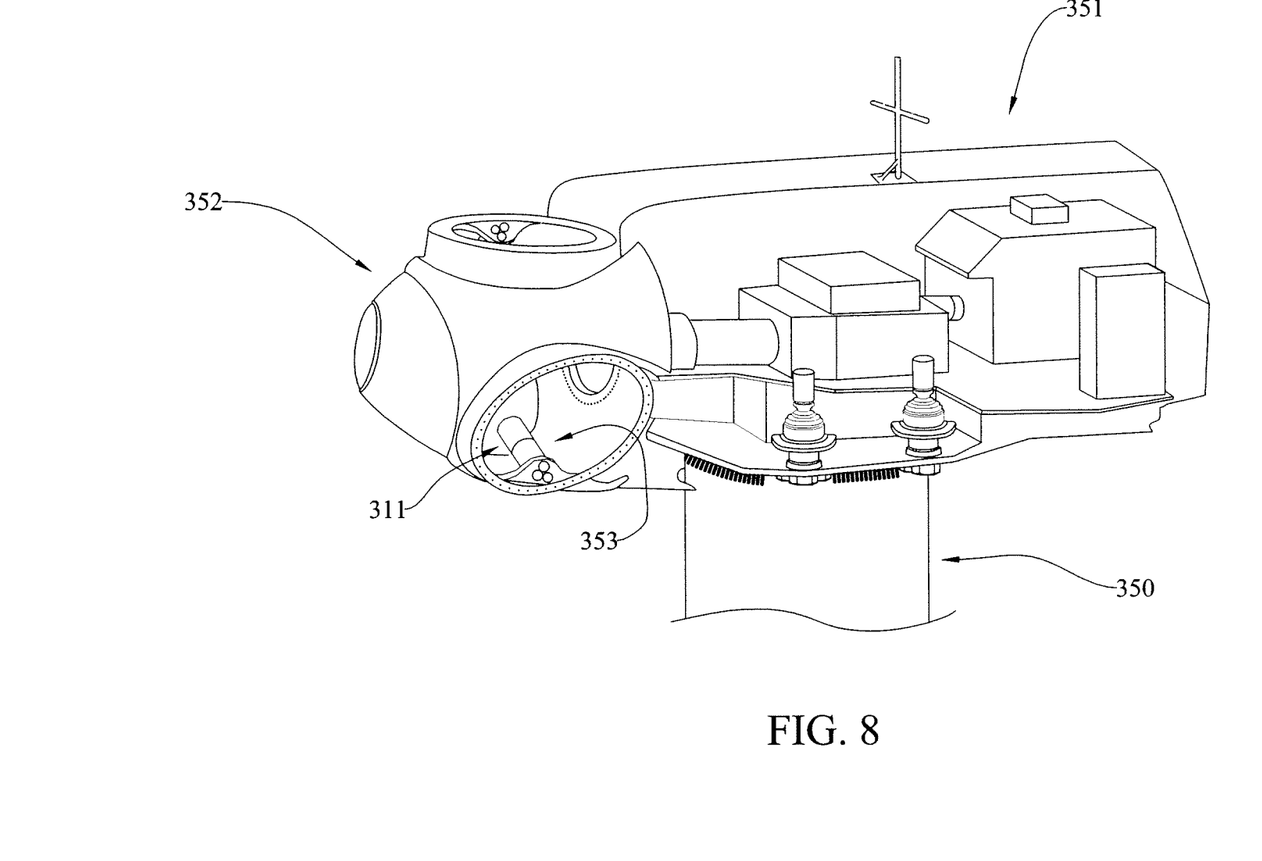
FIG. 8 is a partial perspective view of the internal physical arrangement of the wind turbine pitch control system shown in FIG. 7.

FIG. 7 shows third embodiment 310, particularly configured for use in controlling the pitch of wind turbine blades. As shown in FIG. 7, wind turbine 310 generally includes tower 350, body or nacelle 351 rotationally supported at the top of tower 351, and rotor 352 rotationally coupled to nacelle 351. Tower 350 is secured to the ground and has a height and size that varies depending on conditions and desired performance. Alternatively, instead of a tower mounted wind power generating turbine, the power generator may be positioned adjacent to the ground or may be a power generating turbine configured to harness power from water flow or tides. Thus, the term power generator turbine is intended to include any turbine that generates electrical power from rotational energy, whether that energy is generated by wind flow, water flow or other motion. Nacelle 351 is mounted on the upper marginal end portion of tower 350 and is configured to rotate generally about vertical axis y-y. Nacelle 351 is rotated about axis y-y on tower 350 by a yaw control that is configured to rotate nacelle 351 on top of tower 350 so as to orient itself relative to the wind direction or airflow. Thus, the yaw control may rotate nacelle 351 to adjust the angle between the direction faced by hub 352 and the wind direction. Nacelle 351 houses an electric generator together with a turbine control system and may include other components, sensors and control systems known in the art. Wind turbine 310 is coupled to a power grid (not shown) for transmitting electrical power generated by turbine 310 and its electric generator. Nacelle 351 rotationally supports hub 352, which is mounted on nacelle 351 for rotation generally about horizontal axis 395. As described below, a plurality of blades or airfoils 316 extend radially outward from hub 352 for converting wind energy into rotational energy. Although rotor 352 typically has three blades, any number of blades or airfoils may be used. Blades 316 may have various lengths, shapes and configurations depending on the conditions. Each of blades 316 is pitch controlled and rotates relative to hub 352 about its longitudinal axis on a roller bearing to vary the pitch or angle of the blade relative to the wind in which it is positioned. Hub 352 is rotationally coupled to an electric generator by a rotor shaft and gear box so as to generate electric power from rotational energy produced by blades 316 and rotation of hub 352. Operation of electrical generators to generate electrical power from the rotational energy of hub 352 is known in the art.

Hub 352 includes pitch control actuator 353. Pitch control actuator 353 is configured to selectively control the pitch angle of blade 316 and is coupled to a control system. In this embodiment, the pitch angle of each of blades 316 is individually controlled by individual pitch control actuators 353. Pitch control actuator 353 rotates blade 316 about its longitudinal axis 396 relative to hub 352. A bearing is provided to allow for rotation of blade 316 about its longitudinal axis relative to hub 352 and pitch control actuator 353 operates across that bearing. Pitch control actuator 353 generally includes motor 311 and a geared interface.

Thus, wind turbine system 310 has main axis of rotation 395, and three blades. Each blade 316 has a pitch rotation axis 396. Additionally, each blade has an angle sensor and a pitch motor 311. Each blade 316 also has its own pitch control box. Within each pitch control box is a power supply connection, energy storage, switch network, power sensor and controller, similar to the components in system 210. The power supply connection is attached to an external AC grid power source.

FIG. 7 shows blade 316 at a neutral pitch angle. The sum of all forces caused by the wind on blade 316 is represented by a wind center of force. When blade 316 is in a neutral position, the wind center of force is aligned to pass through pitch rotation axis 396. Thus, the wind center of force will generally not create a torque on blade 316 about pitch rotation axis 396.

Wind turbine pitch control system 310 operates in the same general manner as aircraft spoiler system 210 with some minor variations. Whereas aircraft spoiler system 210 attempts to prevent the crashing of spoiler 216 into wing 265 in the event of a power failure, wind turbine pitch control system 310 attempts to allow turbine blades 316 to move into and stop at a feathered position in event of a power failure. Similar to how aircraft spoiler system 210 triggers a braking mode based on the proximity of spoiler 216 to wing 265, pitch control system 310 triggers a braking mode based on each blade's pitch angle relative to its feathered position.

The described electric motor control systems resulted in several surprising advantages over the prior art. By waiting until an object is close to a substantially neutral position before applying braking, stored power is efficiently used to brake only when the object is likely to be stopped in a safer position, that is a position in which external forces are less likely to cause the object to accelerate when braking power is lost or depleted. More specifically, by triggering braking to be initiated only when the driven object is close to the neutral position, the chance that the system stops the object in the neutral position is greatly increased. Unlike an alternative system, which automatically engages braking in the event of a power source failure (which may cause local power to be depleted when the driven object is in a non-neutral position, causing it to start again), the present embodiments only depletes stored power when the driven object is close to the neutral position where it can remain at rest without braking power.

Additionally, the present embodiments result in the advantage that beneficial momentum from movement of the driven object toward the neutral position is not wasted. For example, if external power is lost while the driven object is moving toward the neutral position, because the system is not automatically braked, the momentum bringing the object to the neutral position is not lost by premature braking.

Further, by utilizing multiple braking modes of regenerative braking, dynamic braking and active braking, the advantages of each braking scheme are combined. For example, by regeneratively braking, kinetic energy is used to prolong the supply of stored power. By having a dynamic braking option, the system is protected from overspeed conditions which may limit a purely regenerative system. Additionally, by having active braking, the system is able to stop when motor speeds are below the minimum limit to effectively dynamically or regeneratively brake. Additionally, since multiple braking systems are employed, the safety factor of the system is increased. If one of the braking systems fails, another is available to stop the driven object.

Moreover, since power is only depleted at critical times, and since power is regeneratively captured, the present embodiments can save costs, as smaller energy storage devices can be used than would otherwise be possible.

While the presently-preferred form of the electric motor system has been shown and described, and several modifications thereof discussed, persons skilled in this art will readily appreciate that various additional changes may be made without departing from the scope of the invention, as defined and differentiated by the following claims.

What is claimed is:

1. An electric motor system comprising:
a power supply;
an electric motor connected to said power supply and having a braking element;
an object mechanically coupled to said electric motor and driven by said motor;
said object having a range of motion and a substantially neutral position within said range of motion;
a power sensor configured to sense power from said power supply;
a position sensor configured to sense position of said object in at least a portion of said range of motion;
an energy storage connected to said electric motor;
a controller connected to said position sensor, said power sensor and said energy storage;
said controller configured and arranged to brake said motor using said braking element and power from said energy storage based on both said sensed position of said object by said position sensor relative to said neutral position and said sensed power from said power supply by said power sensor dropping below a threshold.

2. The electric motor system set forth in claim 1, wherein said electric motor comprises at least two input terminals, said braking element comprises a switching network configured to selectively connect said terminals of said electric motor, and said controller is configured to dynamically brake said motor.

3. The electric motor system set forth in claim 2, wherein said braking element comprises a dissipation switch in series with a dissipation resistor connected to said motor, and wherein said controller is configured to operate said dissipation switch such that energy from said motor is dissipated with said dissipation resistor.

4. The electric motor system set forth in claim 1, wherein said controller is configured to regeneratively brake said motor.

5. The electric motor system set forth in claim 4, and further comprising a switching network connected to said motor, and wherein said controller is configured to operate said switching network such that energy from said motor is used to charge said energy storage when said energy storage is not fully charged.

6. The electric motor system set forth in claim 5, wherein said energy storage comprises a capacitor or a battery.

7. The electric motor system set forth in claim 5, wherein said switching network comprises six switch elements in an H bridge configuration.

8. The electric motor system set forth in claim 1, wherein said controller is configured to actively brake said motor.

9. The electric motor system set forth in claim 8, wherein said braking element comprises a brake actuator.

10. The electric motor system set forth in claim 9, and further comprising a switching network connected to said brake actuator and said energy storage, and wherein said controller is configured to operate said switching network such that energy from energy storage is used to brake said motor.

11. The electric motor system set forth in claim 10, wherein said switching network comprises six switch elements in an H bridge configuration.

12. The electric motor system set forth in claim 11, wherein said switch elements comprise IGBTs or MOSFETs.

13. The electric motor system set forth in claim 1, wherein said controller is configured to selectively actively brake, dynamically brake or regeneratively brake said motor.

14. The electric motor system set forth in claim 13, and further comprising a switching network and a dissipation resistor connected to said motor, wherein said controller is configured to operate said switching network such that energy from said motor is selectively dissipated with said dissipation resistor or used to charge said energy storage when said energy storage is not fully charged.

15. The electric motor system set forth in claim 1, and further comprising a power rectifier connected to said power supply.

16. The electric motor system set forth in claim 15, wherein said power rectifier comprises a full wave diode rectifier.

17. The electric motor system set forth in claim 1, wherein said object comprises an aircraft spoiler panel on an aircraft wing.

18. The electric motor system set forth in claim 17, wherein said neutral position is about four degrees from said aircraft wing.

19. The electric motor system set forth in claim 1, wherein said object comprises a turbine blade on a power generating turbine.

20. The electric motor system set forth in claim 19, wherein said neutral position is a feathered position.

21. The electric motor system set forth in claim 1, wherein said position sensor comprises an encoder, a resolver or a LVDT.

22. The electric motor system set forth in claim 1, wherein said power sensor comprises a voltage sensor or a FPGA validity sensor.

23. The electric motor system set forth in claim 1, wherein said power supply comprises a three phase AC power supply.

24. The electric motor system set forth in claim 1, and further comprising an output filter connected to said electric motor.

25. The electric motor system set forth in claim 24, wherein said output filter comprises a common mode filter or a differential mode filter.

26. The electric motor system set forth in claim 1, and further comprising an input filter connected to said power supply.

27. The electric motor system set forth in claim 26, wherein said input filter comprises a common mode filter or a differential mode filter.

28. The electric motor system set forth in claim 1, and further comprising a soft start switch.

29. A method of driving a system for an electric motor, said system having an external power supply input, a position sensor signal input, a switching network having switch gates, a controller, and an energy storage, comprising the steps of:
monitoring with said controller said position sensor signal input;
monitoring with said controller said external power supply input; and
operating with said controller said switch gates to absorb power from said electric motor based on both said position sensor input relative to a neutral position and said external power supply input dropping below a threshold.

30. The method set forth in claim 29, wherein said step of operating said switch gates comprises operating said switch gates to absorb power from said electric motor when said power supply input drops below a voltage threshold and said position sensor signal input is below a position threshold.

31. The method set forth in claim 29, and further comprising the step of providing a dissipation resistor connected to said motor.

32. The method set forth in claim 31, and further comprising the step of selectively directing said absorbed power to said energy storage or said dissipation resistor as a function of whether said energy storage is fully charged.

33. The method set forth in claim 29, and further comprising the step of using power from said energy storage to actively brake said electric motor as a function of said position sensor input and said external power supply input.

34. The method set forth in claim 33, wherein said step of using power from said energy storage to actively brake said electric motor comprises actively braking said electric motor when a rate of change of said position sensor input signal is below a speed threshold, said power supply input drops below a voltage threshold, and said position sensor signal input is below a position threshold.

35. The method set forth in claim 34, wherein said step of operating said switch gates comprises operating said switch gates to absorb power from said electric motor when a rate of change of said position sensor input signal is above a speed threshold, said power supply input drops below a voltage threshold, and said position sensor signal input is below a position threshold.

36. The method set forth in claim 35, and further comprising the step of providing a dissipation resistor connected to said motor.

37. The method set forth in claim 36, and further comprising the step of selectively directing said absorbed power to said energy storage or said dissipation resistor as a function of whether said energy storage is fully charged.

38. The method set forth in claim 29, wherein said local energy storage comprises a capacitor or a battery.

39. The method set forth in claim 29, and further comprising the step of providing a power rectifier connected to said power supply input, and converting an AC voltage on said power supply input into a DC voltage.

40. The method set forth in claim 39, wherein said power rectifier is a full wave diode rectifier.

41. The method set forth in claim 29, and further comprising the step of providing a soft start switch.

42. The method set forth in claim 29, wherein said position sensor signal input is configured to connect to an encoder, resolver or LVDT.

43. The method set forth in claim 29, wherein said electric motor is configured to connect to an aircraft wing spoiler actuator.

44. The method set forth in claim 29, wherein said electric motor is configured to connect to a power generating turbine blade pitch control actuator.

45. The method set forth in claim 29, wherein said external power supply input is configured for a three phase AC power source.

46. The method set forth in claim 29, and further comprising the step of filtering a signal coming in on said external power supply input or filtering a signal going to said electric motor.

47. The method set forth in claim 29, and further comprising the step of providing a brake actuator.

48. A driver for an electric motor comprising:
an external power supply input;
a power sensor having an output and configured to monitor said external power supply input;
a position sensor having an output;
an AC to DC power rectifier;
a switching network having switch gates and configured to convert a DC power from said power rectifier to an AC source for said electric motor;
a control connected to said switch gates and configured to monitor said power sensor output and said position sensor output and configured to operate said switch gates;
a local energy storage for temporarily supplying power to said switching network;
wherein said control is configured to operate said switch gates such that a recovered power is drawn from said electric motor based on both said power sensor output dropping below a threshold and said position sensor output relative to a neutral position.

49. The driver set forth in claim 48, and further comprising a dissipation resistor connected to said electric motor.

50. The driver set forth in claim 49, wherein said control is configured to direct power from said electric motor to said dissipation resistor.

51. The driver set forth in claim 49, wherein said control is configured to operate said switching network such that energy from said motor is selectively directed to said dissipation resistor or said local energy storage when said local energy storage is not fully charged.

52. The driver set forth in claim 48, wherein said control is configured to direct power from said electric motor to said local energy storage.

53. The driver set forth in claim 48, and further comprising a brake actuator connected to said local energy storage.

54. The driver set forth in claim 53, wherein said control is configured to operate said switching network such that energy from said local energy storage is directed out said brake actuator.

55. The driver set forth in claim 48, wherein said switching network comprises six switch elements in an H bridge configuration.

56. The driver set forth in claim 55, wherein said switch elements comprise IGBTs or MOSFETs.

57. The driver set forth in claim 48, wherein said control is configured to selectively actively brake, dynamically brake or regeneratively brake said electric motor.

58. The driver set forth in claim 48, wherein said power rectifier comprises a full wave diode rectifier.

59. The driver set forth in claim 48, and further comprising an output filter connected to said switching network.

60. The electric motor system set forth in claim 59, wherein said output filter comprises a common mode filter or a differential mode filter connected to said AC to DC power rectifier.

61. The driver set forth in claim 48, and further comprising an input filter connected to said AC to DC power rectifier.

62. The driver set forth in claim 61, wherein said input filter comprises a common mode filter or a differential mode filter.

63. The driver set forth in claim 48, and further comprising a soft start switch.

* * * * *